United States Patent
Pahlitzsch et al.

(10) Patent No.: US 10,394,021 B2
(45) Date of Patent: Aug. 27, 2019

(54) CAMERA COVER GLASS UNIT WITH WATER REMOVAL FUNCTION

(71) Applicant: Axis AB, Lund (SE)

(72) Inventors: Jens Pahlitzsch, Lund (SE); Sven Svensson, Furulund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/344,913

(22) Filed: Nov. 7, 2016

(65) Prior Publication Data
US 2017/0146795 A1    May 25, 2017

(30) Foreign Application Priority Data
Nov. 17, 2015    (EP) ..................................... 15194934

(51) Int. Cl.
*H02K 7/00* (2006.01)
*G02B 27/00* (2006.01)
(Continued)

(52) U.S. Cl.
CPC .......... *G02B 27/0006* (2013.01); *G03B 11/00* (2013.01); *G03B 17/56* (2013.01);
(Continued)

(58) Field of Classification Search
CPC ...... H02K 7/003; G02B 27/0006; G02B 7/02; G02B 1/18; G02B 23/16; G03B 17/568; G03B 17/561; G03B 17/566; G03B 17/08; G03B 11/045; B60S 1/56; B60S 1/023; B60S 1/04; B60S 1/0848; B60S 1/481;
(Continued)

(56) References Cited

U.S. PATENT DOCUMENTS

| | | | |
|---|---|---|---|
| 4,010,396 A | * | 3/1977 | Ress ......................... G21B 1/00 310/11 |
| 2003/0137752 A1 | * | 7/2003 | Sherwin ................. G03B 11/00 359/809 |

(Continued)

FOREIGN PATENT DOCUMENTS

| | | |
|---|---|---|
| CN | 1683267 A | 10/2005 |
| CN | 101231447 A | 7/2008 |

(Continued)

OTHER PUBLICATIONS

EP 15 19 4934.4 European Search Report (dated Feb. 29, 2016).
Japanese Office Action dated Feb. 27, 2018 for the Japanese Patent Application No. 2016-219684.

*Primary Examiner* — Jade R Chwasz
(74) *Attorney, Agent, or Firm* — Volpe and Koenig, P.C.

(57) ABSTRACT

A camera cover glass unit comprises a cover glass, arranged to protect an image capturing unit of a camera and a cover glass frame arranged to hold the cover glass is disclosed. A resilient structure is mounted between the cover glass and the cover glass frame and allows the cover glass to move in relation to the cover glass frame. A first permanent magnet is attached to the cover glass, and a motor is arranged to rotate a second permanent magnet in relation to the first magnet, in order to achieve a time-variant magnetic field, such that the second magnet attracts and repels the first magnet to a varying degree, thereby causing the cover glass to move in relation to the frame.

16 Claims, 3 Drawing Sheets

(51) Int. Cl.
*G03B 11/00* (2006.01)
*G03B 17/56* (2006.01)

(52) U.S. Cl.
CPC ......... *G03B 17/565* (2013.01); *G03B 17/568* (2013.01); *H02K 7/003* (2013.01)

(58) Field of Classification Search
CPC . B60S 1/566; B60S 1/62; B60R 11/04; B60R 1/00; B60R 1/0602; B60R 2011/004; B08B 1/002; B08B 1/006; B08B 3/10
USPC .................... 359/508, 507, 511, 513, 514
See application file for complete search history.

(56) References Cited

U.S. PATENT DOCUMENTS

2004/0216253 A1* 11/2004 Enoch, III ............... A47L 1/02
15/103
2008/0284850 A1 11/2008 Blaesing et al.
2013/0104933 A1* 5/2013 Aldred ............... G02B 27/0006
134/6
2014/0060582 A1 3/2014 Hartranft et al.

FOREIGN PATENT DOCUMENTS

| | | |
|---|---|---|
| CN | 104652669 A | 5/2015 |
| DE | 20 2009 008219 U1 | 11/2010 |
| JP | 5032191 U | 4/1993 |
| JP | 3094807 U | 7/2003 |
| JP | 2004-512652 A | 4/2004 |
| JP | 2011-244417 A | 12/2011 |
| JP | 2012-237941 A | 12/2012 |
| JP | 2013-119299 A | 6/2013 |
| JP | 2013-211653 A | 10/2013 |
| JP | 2013 211653 A2 | 10/2013 |
| WO | 2005/096091 A1 | 10/2005 |
| WO | WO 2012046131 A1 * 4/2012 ........... B02C 17/005 |
| WO | 2012/095351 A1 | 9/2012 |

* cited by examiner

CAMERA COVER GLASS UNIT WITH WATER REMOVAL FUNCTION

FIELD OF INVENTION

A camera cover glass unit which is arranged to remove water from a camera cover glass is disclosed.

BACKGROUND

Monitoring cameras are commonly used to monitor building, roads, shops and various other places. In particular, cameras are often used to monitor scenes to allow automatic detection or tracking of events in the form of presence of motion or presence of an object of a specific type. Such monitoring cameras can be used both indoors and outdoors. A monitoring camera mounted outdoors is sometimes exposed to harsh weather conditions such as wind, snow and rain. A common problem which occurs when rain drops are present in the view of the camera is that these by mistake trigger alarms. This typically happens when the camera is unable to separate a small object close by, such as a rain drop trickling down the cover glass of the camera lens, from a larger object more far away, such as a car or a person moving at a distance from the camera.

Another problem which may occur when rain drops or other drops of water (or other fluids) are present on a cover glass of the camera is that the camera's focus lens system will focus on the rain drops, instead of on more interesting objects in the monitored environment. These "real" objects may then become blurry and difficult to see for an operator.

Different solutions have been presented in this area, such as window wipers that clear the water from the camera cover glass. However, there is still room for improvement in this area.

SUMMARY

In view of the above, it is thus an object of the present disclosure to provide an efficient and reliable way of removing rain drops from a camera cover glass.

In accordance with a first aspect, a cover glass unit comprises a cover glass, arranged to protect an image capturing unit of a camera, a cover glass frame, arranged to hold the cover glass, a resilient structure, mounted between the cover glass and the cover glass frame, and allowing the cover glass to move in relation to the cover glass frame, a first permanent magnet, attached to the cover glass, a second permanent magnet, and a motor, arranged to rotate the second magnet in relation to the first magnet, in order to achieve a time-variant magnetic field, such that the second magnet attracts and repels the first magnet to a varying degree, thereby causing the cover glass to move in relation to the frame.

The movement of the cover glass will cause rain drops on the cover glass to move down along the glass and disappear from the view of the camera, thereby providing a better image quality. The rotation of the second magnet in relation to the first magnet will cause a roughly circular motion, not only a linear, back-and-forth motion. This will cause the rain drops to move not only downwards, but also towards each other sideways, and thereby cause aggregation of the water drops into larger drops, which more easily will move down the cover glass. In this way a more efficient removal of water from the cover glass is achieved.

The motor may be a DC motor, which is a cost efficient and fail safe option, which additionally will reduce the risk of causing sparks which may damage the sensitive electronic and optic devices in the camera. The second magnet may conveniently be arranged on a rotation axle of the DC motor.

The motor may be mounted on the cover glass frame. This provides for a compact mounting solution.

The motor is preferably arranged to rotate the second magnet at a frequency of less than 100 Hz, and particularly at a frequency of 40-70 Hz. This will move water drops down the cover glass, while still allowing the drops to aggregate as they move sideways in response to the roughly circular motion of the cover glass, thereby collecting also small drops and efficiently clearing the cover glass from water. A higher frequency than 100 Hz is less efficient as water drops will not have time to move sideways to gather into larger drops and capture the smaller drops between them. A frequency lower than 40 Hz would be too slow and would not cause any movement of the water drops in relation to the surface of the cover glass.

The motor may be arranged to rotate the second magnet in a plane parallel to a plane of the cover glass, and additionally, or as an alternative, the motor may be arranged to rotate the second magnet in a plane non-coinciding with the plane of the cover glass. In other words, the motor may be arranged to rotate the second magnet to either cause a two-dimensional movement of the cover glass, when the second magnet rotates in the same plane as the cover glass, or cause a three-dimensional movement of the cover glass, either by rotating the second magnet in a plane parallel to, but displaced from the plane of the cover glass, or by rotating the second magnet in a plane which is inclined to, or at an angle to, the plane of the cover glass.

The first magnet may be mounted at an edge of the cover glass, thereby allowing it to be close to the second magnet when this is mounted on or near the frame. Placing the first magnet as close to the second magnet as possible will make the magnetic force between them stronger, allowing for smaller magnets to be used.

The first magnet may be fully or partially embedded in the cover glass, which allows the first magnet to be more or less hidden from sight and giving an attractive appearance of the cover glass. The mounting of the cover glass in the resilient structure in the frame may also be simplified by the first magnet being mounted flush with the surface of the cover glass.

One or both of the first magnet and the second magnet may be neodymium magnets. As this material is very strongly magnetic, it allows for using small magnets which are easy to mount.

The resilient structure is preferably bellow shaped. Such a shape allows for movement of the cover glass in several directions. The resilient structure may conveniently comprise a rubber material, which provides a flexible material which also is resistant to water.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or steps of the methods described as such device and method may vary. It is also to be understood that the terminology used herein is for purpose of describing particular embodiments only, and is not intended to be limiting.

It is noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

A more detailed understanding may be had from the following description, given by way of example in conjunction with the accompanying drawings wherein.

DETAILED DESCRIPTION

Figure 1:
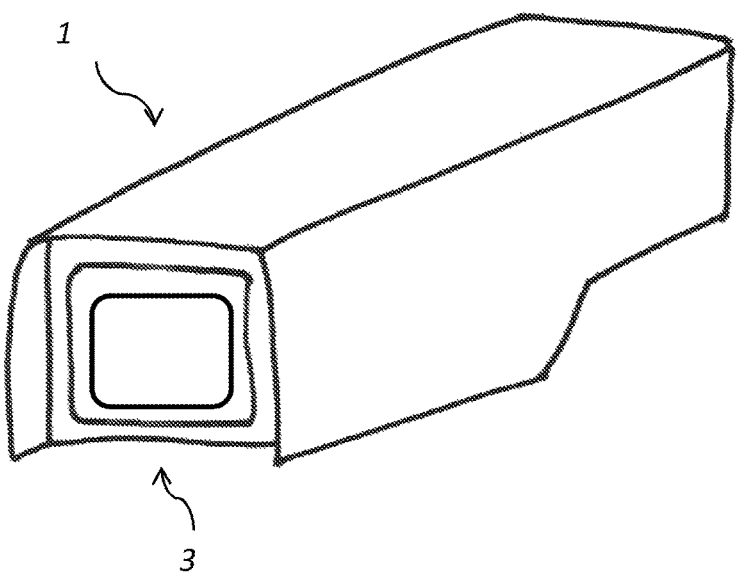
FIG. 1 is a perspective view of a camera with a cover glass unit.
Figure 2:
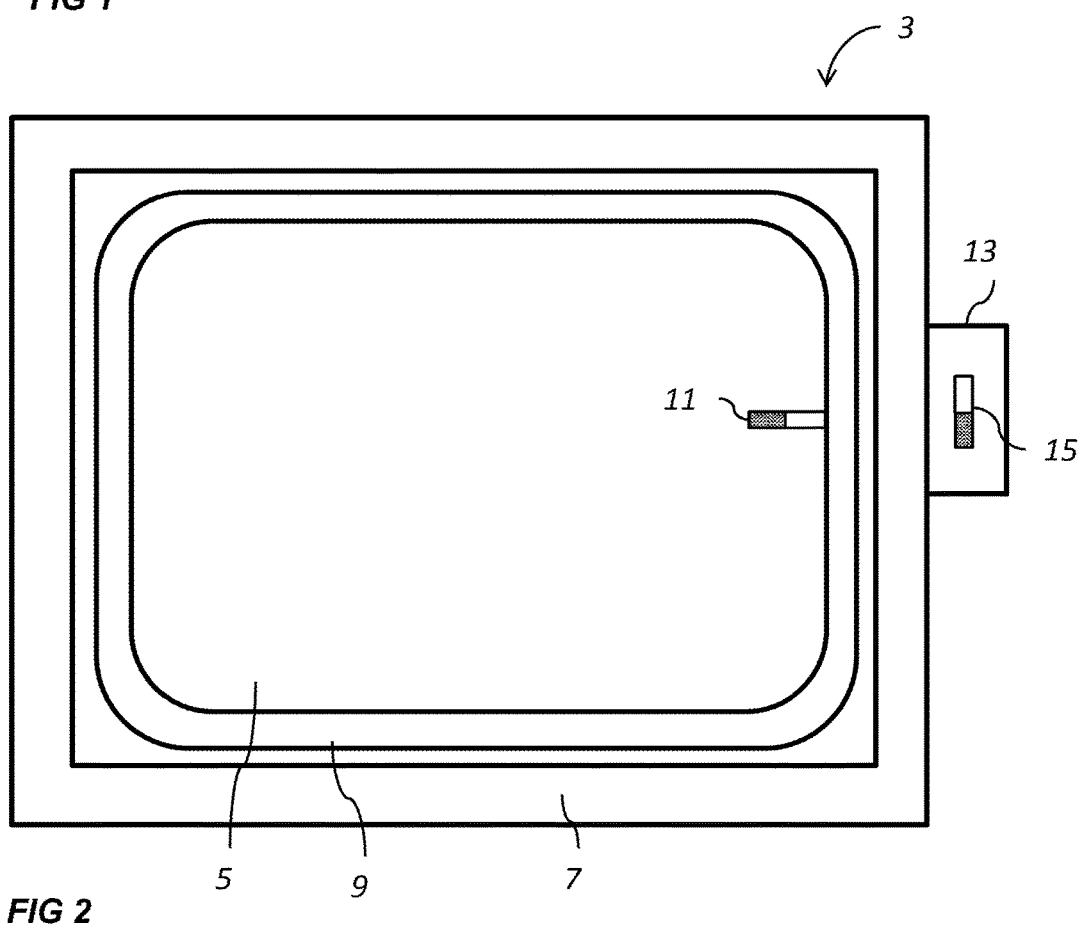
FIG. 2 is a front view of the cover glass unit.

FIGS. 1 and 2 show a camera 1 with a cover glass unit 3. The cover glass unit 3 includes a cover glass 5 which is mounted in a frame 7 via a resilient structure 9, in this example in the form of a bellow shaped rubber gasket. Other materials and shapes of the resilient structure may also be used, provided that they allow the cover glass 5 to move in relation to the frame 7. The cover glass 5 can e.g. be made of some type of mineral glass, or a plastic material such as polycarbonate or acrylic glass. The cover glass protects an image capturing unit (not shown) of the camera from the environment.

A first permanent magnet 11 is attached to the cover glass 5. In the shown example the first permanent magnet 11 is attached to an edge of the glass, but it could also be mounted on some type of structure, such as an arm or a pin, extending from the cover glass 5. The first magnet 11 can be fully or partly embedded in the cover glass 5. It can be attached to the cover glass 5 e.g. via glue or a screw joint. It should be noted that in the figures, the first magnet 11 is shown as being mounted with its magnetic axis perpendicular to the closest edge of the cover glass 5, with its south pole closest to frame 7. However, this placing is merely an example. The first magnet 11 could be placed in any convenient way, such as parallel to the edge of the cover glass 5, or at any angle to the edge of the cover glass 5.

The cover glass unit 3 further includes a motor 13, which is arranged to rotate a second permanent magnet 15. One choice would be to use a simple DC motor, and mount the second magnet 15 on the rotation axle of the motor, i.e. such that the magnetic axis of the second magnet lies in a plane which is perpendicular to the rotational axis of the motor. The second magnet 15 may be mounted directly on the rotation axle of the motor 13, but it may also be mounted on a separate device which is operatively connected to the rotational axle of the motor 13, and driven to rotate by the motor 13. The option shown in the accompanying drawings is where the second magnet 15 is mounted directly on the rotation axle of the motor 13. The second magnet 15 may e.g. be attached to the rotation axle by glue, clamps, a press fit or any other suitable means.

The motor 13 is in turn mounted on the frame 7 or on some other location which is fixed in relation to the cover glass 5, such as on a housing of the camera 1.

The first magnet 11 and the second magnet 15 are usually neodymium magnets, but other choices such as ferrite magnets are also possible. In addition, it might be noted that both the first and the second magnet are illustrated in the shape of bar magnets. However, the first and the second magnets could be of any shape and form, e.g. bars, cylinders, rods, discs or spheres. Either way, the rotation of the second magnet 15 creates a time-variant magnetic field affecting the first magnet 11. In other words, the first magnet 11 and the second magnet 15 repels and attracts each other to a varying degree as the motor 13 rotates the second magnet 15, and this in turn causes the cover glass 5 to move in a roughly circular and back-and-forth fashion in relation to the frame 7.

As the inventors have realized, when the cover glass 5 moves in this way, rain drops that have landed on the cover glass 5 will very efficiently be caused to move down along the cover glass 5 and in this way be removed from the view of the camera 1. The cover glass 5 moving in this slightly circular way, and not only in a linear back-and-forth movement, will cause the raindrops to gather into larger drops which in turn are much more likely to quickly move down the cover glass 5 and out of sight of the image capturing unit of the camera 1, and in addition collect smaller drops of water on the way. The motor 13 is normally set to rotate the second magnet at a rotational frequency of less than 100 Hz, and usually at a frequency of 40-70 Hz, as this gives a movement of the window which has been seen to help moving the rain drops in an efficient manner off the cover glass.

Figure 3:
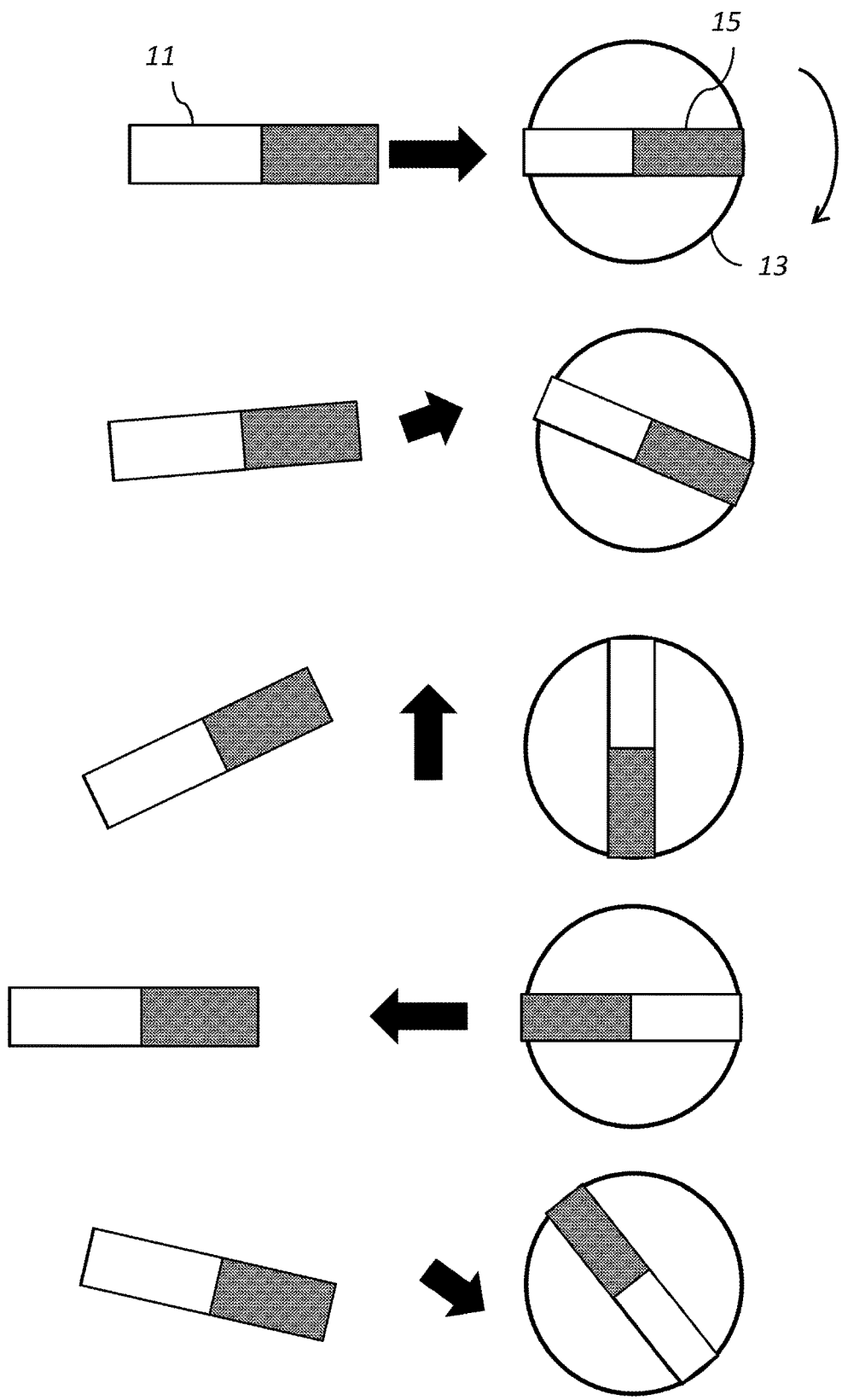
FIG. 3 schematically shows magnets in the cover glass unit.

FIG. 3 illustrates the interaction between the first magnet 11 and the second magnet 15 in some exemplifying rotational positions of the second magnet 15. The arrows roughly symbolize the size and the direction of the forces acting on the first magnet 11 at different rotational positions of the second magnet 15.

Figure 4:
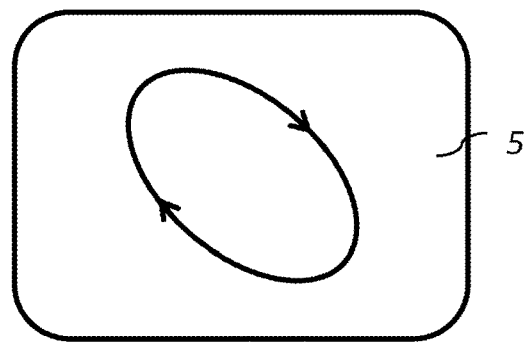
FIG. 4 illustrates movement of a cover glass.

In FIG. 4 the arrows illustrate the resulting movement caused in the cover glass 5 by the interaction between the two magnets 11, 15 during rotation of the motor 13.

Figure 5A:
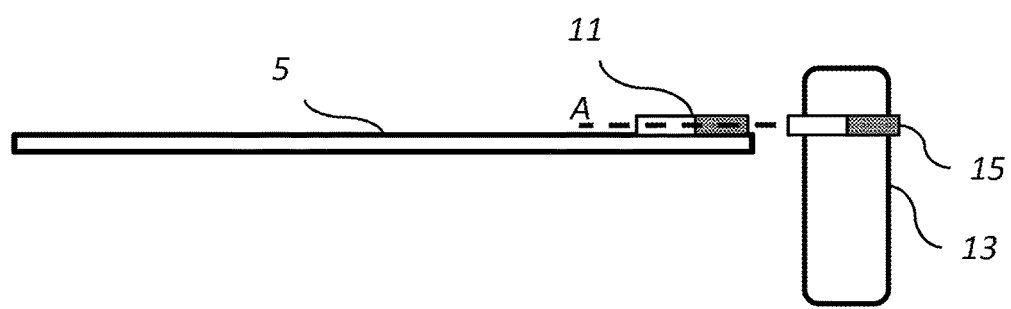
FIGS. 5a, 5b and 5c show different mounting options of the magnets.
Figure 5B:
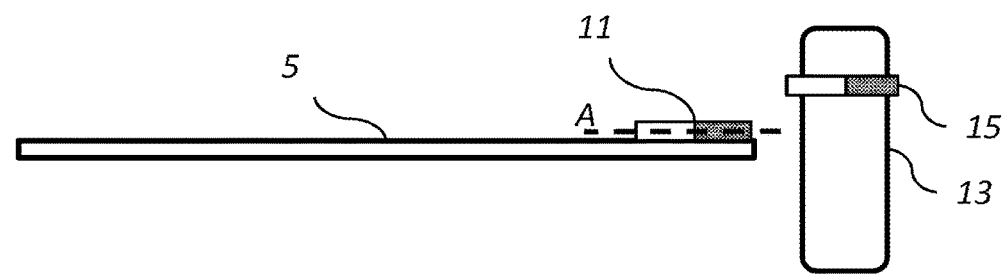
Figure 5C:
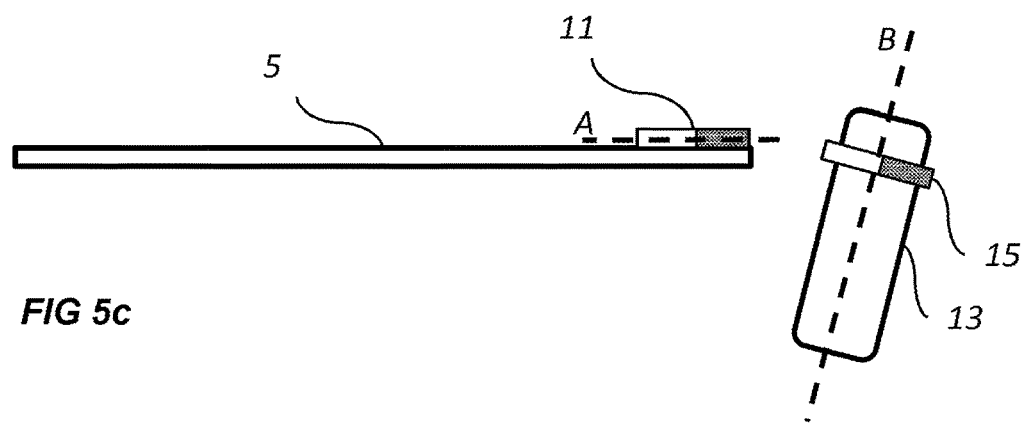

Some different options for the mounting of the second magnet 15 and the motor 13 are illustrated in FIGS. 5a-c. In FIG. 5a the second magnet rotates in a plane which coincides with the plane of the cover glass 5, or more precisely the plane of the first magnet 11. This mounting option will cause a movement of the cover glass in the described roughly circular fashion in two dimensions. However, in order to even further enhance the rain drop removal effect, the cover glass 5 could also be made to perform a movement in three dimensions. This can be achieved by mounting the motor 13 with the second magnet 15 according to the options shown in FIG. 5b or 5c.

In FIG. 5b the second magnet 15 rotates in a plane parallel to, but displaced from the plane of the cover glass 5, or, more precisely, the plane parallel to the cover glass 5 in which the first magnet's magnetic axis A is located.

In FIG. 5c, another variant is shown where the second magnet 15 and the motor 13 is mounted such that the rotation axis B of the motor, and the second magnet 15, is inclined in relation to the plane of the cover glass 5.

Both of the latter options will cause a movement of the cover glass not only in the roughly circular back-and-forth fashion illustrated in FIG. 4, but also in a third dimension.

Other variants and options are also possible. Both or one of the first and the second magnet may e.g. comprise two or more magnets, mounted in such a fashion that a similar motion of the cover glass to what has been described is still achieved.

What is claimed is:

1. A camera cover glass unit, comprising:
   a cover glass arranged to protect an image capturing unit of a camera;
   a cover glass frame, the cover glass frame being stationary and supporting the cover glass;
   a resilient structure, mounted between the cover glass and the cover glass frame, and allowing the cover glass to move in at least a linearly displaceable manner relative to the cover glass frame;
   a first permanent magnet fixed to the cover glass;
   a second permanent magnet; and
   a motor, arranged to rotate the second magnet in relation to the first magnet, in order to achieve a time-variant magnetic field, such that the second magnet alternately attracts and repels the first magnet, thereby causing the cover glass to move in relation to the cover glass frame and variation of a relative distance between the cover glass and the cover glass frame.

2. The camera cover glass unit of claim 1, wherein the motor is a DC motor.

3. The camera cover glass unit of claim 2, wherein the second magnet is arranged on a rotation axle of the DC motor such that the second magnet rotates about an axis of the second magnet.

4. The camera cover glass unit of claim 1, wherein the motor is mounted on the cover glass frame.

5. The camera cover glass unit of claim 1, wherein the motor is arranged to rotate the second magnet at a frequency of less than 100 Hz.

6. The camera cover glass unit of claim 1, wherein the motor is arranged to rotate the second magnet at a frequency between 40 Hz and 70 Hz.

7. The camera cover glass unit of claim 1, wherein the motor is arranged to rotate the second magnet in a plane parallel to a plane of the cover glass.

8. The camera cover glass unit of claim 1, wherein the motor is arranged to rotate the second magnet in a plane non-coinciding with a plane of the cover glass.

9. The camera cover glass unit of claim 1, wherein the first magnet is mounted at an edge of the cover glass.

10. The camera cover glass unit of claim 1, wherein the first magnet is fully or partially embedded in the cover glass.

11. The camera cover glass unit of claim 1, wherein one or both of the first magnet and the second magnet are neodymium magnets.

12. The camera cover glass unit of claim 1, wherein the resilient structure is a bellow shaped elastic gasket to accommodate the varying relative distance between the cover glass and the cover glass frame.

13. The camera cover glass unit of claim 1, wherein the resilient structure comprises a rubber material.

14. The camera cover glass unit of claim 1, wherein the resilient structure contacts both the cover glass and the cover glass frame.

15. The camera cover glass unit of claim 1, wherein the cover glass has a non-round profile.

16. The camera cover glass unit of claim 1, wherein the cover glass moves three-dimensionally in relation to the cover glass frame based on the second magnet alternately attracting and repelling the first magnet.

* * * * *